United States Patent [19]
Alberni et al.

[11] Patent Number: 5,513,728
[45] Date of Patent: May 7, 1996

[54] BRAKE SYSTEM FOR MINING CONVEYOR

[75] Inventors: Fred M. Alberni, Bellevue; Frank T. Churchill, Redmond; Leonard A. Eros, Tacoma, all of Wash.

[73] Assignee: Reliance Electric Industrial Company, Greenville, S.C.

[21] Appl. No.: 229,694

[22] Filed: Apr. 19, 1994

[51] Int. Cl.⁶ .............................. F16D 55/02; F16D 65/38
[52] U.S. Cl. .................. 188/71.7; 188/71.6; 188/196 A; 188/264 D; 74/572; 192/70.12; 192/91 R; 192/111 A
[58] Field of Search .............................. 74/572; 198/500; 192/70.12, 70.27, 91 R, 111 R, 111 A, 113.34; 417/223, 319; 188/71.5–71.7, 72.3, 73.2, 170, 196 A, 264 D, 264 E, 264 P, 134, 1.11 W, 1.11 WE; 303/10

[56] References Cited

U.S. PATENT DOCUMENTS

| | | | |
|---|---|---|---|
| 3,604,865 | 9/1971 | Bricker | 188/1.11 WE X |
| 3,638,773 | 2/1972 | Lewis et al. | 192/18 A |
| 3,924,715 | 12/1975 | Cory | 192/18 A |
| 3,946,840 | 3/1976 | Sommer | 192/18 A |
| 4,041,801 | 8/1977 | Anderson | 74/572 |
| 4,084,924 | 4/1978 | Ivanoff et al. | 74/572 X |
| 4,183,425 | 1/1980 | Sommer | 192/13 B |
| 4,267,911 | 5/1981 | Cory | 192/18 A |
| 4,415,067 | 11/1983 | Cory | 188/71.5 |
| 4,458,794 | 7/1984 | Yater | 192/18 A |
| 4,483,422 | 11/1984 | Cory | 188/71.5 |
| 4,577,738 | 3/1986 | Yater | 192/18 A |
| 4,607,736 | 8/1986 | Kelley | 192/18 A |
| 4,648,494 | 3/1987 | Yater | 192/18 A |
| 4,724,741 | 2/1988 | Wirth | 188/196 A X |
| 4,739,865 | 4/1988 | Yater et al. | 192/18 A |
| 4,821,847 | 4/1989 | Langdon et al. | 188/171 |
| 4,845,468 | 7/1989 | Stark | 188/1.11 WE X |
| 4,860,862 | 8/1989 | Yater et al. | 192/18 A |
| 4,865,172 | 9/1989 | Sommer | 192/0.02 R |
| 4,921,078 | 5/1990 | Sommer | 188/171 |
| 4,938,321 | 7/1990 | Kelley et al. | 188/171 |
| 5,129,497 | 7/1992 | Kelley | 192/56 R |
| 5,174,420 | 12/1992 | Dewald et al. | 192/91 R X |
| 5,186,288 | 2/1993 | Sommer | 188/171 |
| 5,194,057 | 3/1993 | Sommer | 475/339 |

OTHER PUBLICATIONS

*Belt Conveyors For Bulk Materials,* pp. 166–168, Third Edition, Published by Conveyors Equipment Manufacturers Association (1988).

A Brochure Entitled "Drill–Pac–High Performance Braking System For Use On The Drawworks of Drilling Rigs," Published by Sommer Co., Inc. 2633 Groesbeck Highway, Warren, Michigan 48089, USA.

A Brochure Entitled "Start–Pac–Shaft Mounted Oil Shear Couplings For Soft Starting of Bulk Conveyors," Published by Sommers Co., Inc. 2633 Groesbeck Highway, Warren, Michigan, 48089, USA.

(List continued on next page.)

*Primary Examiner*—Josie Ballato
*Attorney, Agent, or Firm*—Dority & Manning

[57] ABSTRACT

A brake system for use with a rotatable mechanical load. The brake system includes a brake apparatus operative to selectively apply a braking torque to the load. The braking mechanism within the brake apparatus preferably includes a plurality of brake plates interleaved to form a brake plate assembly. The braking mechanism may be biased to normally engage the brake plates so that a predetermined braking torque is applied. In this case, braking torque is varied by controllably releasing engagement of the brake plates. The braking mechanism is preferably designed to apply full braking torque if wear of the brake plates exceeds a predetermined threshold. Heat generated during operation of the braking mechanism is preferably removed by coolant fluid. The coolant fluid may be supplied by a coolant pump driven by operative rotation of a pump drive shaft. A properly-sized flywheel is preferably coupled between the pump drive shaft and the device driving the pump drive shaft. The flywheel functions to continue operation of the pump after a power failure such that coolant fluid will continue to be supplied to the braking mechanism until the mechanical load comes to a stop.

24 Claims, 7 Drawing Sheets

OTHER PUBLICATIONS

An Advertisement Dated "Jan. 1994" Describing Certain Products Marketed By Force Control Industries, Inc., 3660 Dixie Highway, Fairfield, OH, 45014.

A Brochure Entitled "Dodge CST: Controlled Start Transmission System," Reliance Electric, P.O. Box 499, Greenville, SC 29602 (1991).

Selected pages of a publication entitled "Motion Control: Oil Shear Clutch and Brake Systems" published by Force Control Industries, Inc., 3660 Dixie Highway, Fairfield Ohio 45014, bearing a copyright date 1993.

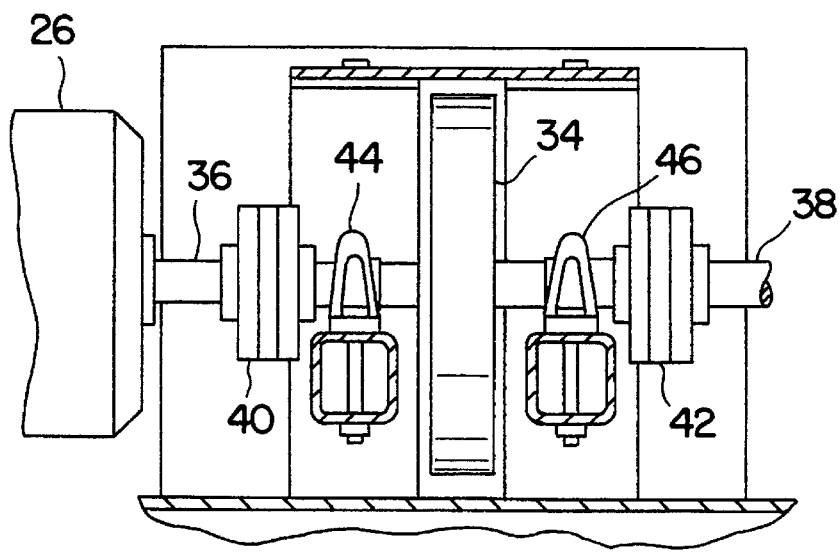
F I G. 2
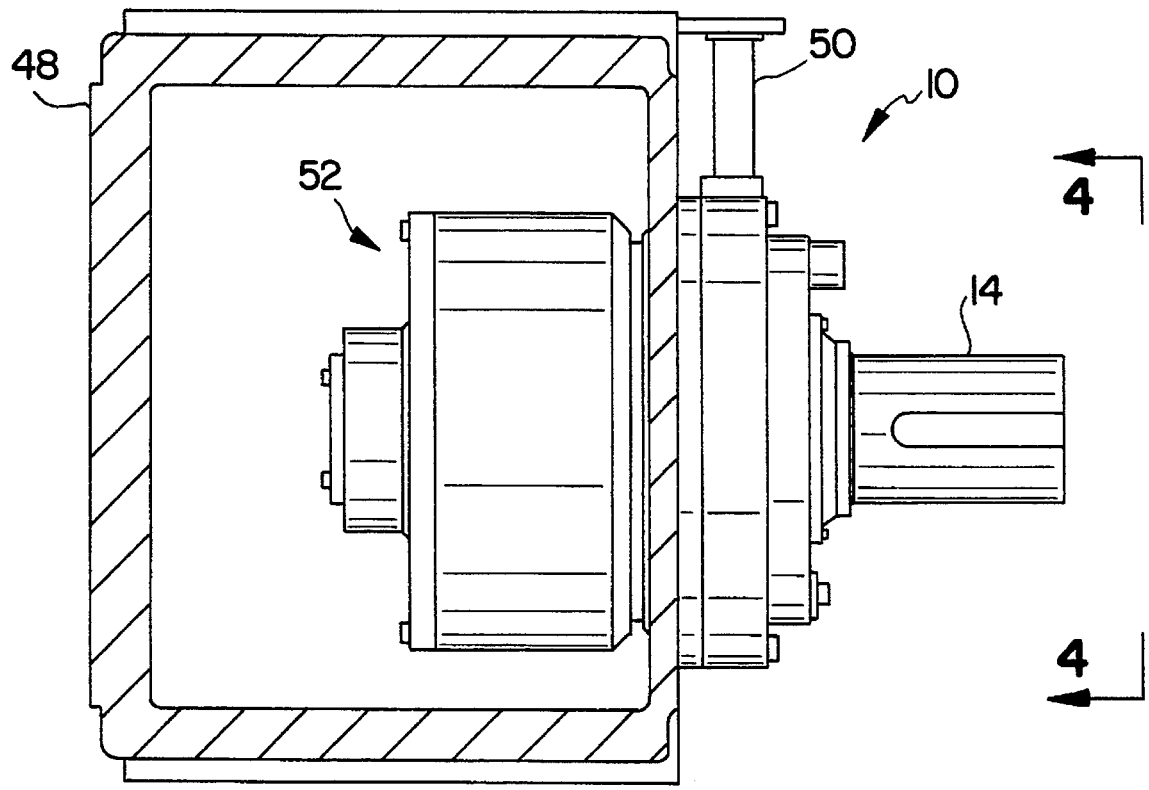
F I G. 3

BRAKE SYSTEM FOR MINING CONVEYOR

BACKGROUND OF THE INVENTION

The present invention generally relates to an improved brake system of the type which may be utilized in various mining or drilling operations. One application in which aspects of the present invention may be particularly useful is that of a conveyer utilized to transport bulk materials.

Belt conveyers are often employed in mining operations to transport mined material to a suitable location where it may be discharged for shipping or further processing. As an example, a belt conveyor may be utilized to carry coal or ore from the mine to a nearby rail line. The coal or ore may then be discharged by the conveyor directly into hopper cars of the train. Conveyers of this type are often very lengthy, frequently having a length exceeding a mile or more. Such conveyers are generally driven by a plurality of drive motors spaced apart along their extent.

It should be appreciated that the geographical area in which mining is performed is often relatively hilly. Due to their length, conveyors employed in a hilly area will generally follow the underlying terrain to some degree. Such a conveyer may, therefore, have various segments of different slopes. For example, consider a conveyer having a length of approximately three miles. This conveyer may have a declined segment, a horizontal segment, and an inclined segment, each of which may be one mile or more in length.

The weight of conveyed bulk materials will often impart significant acceleratory forces on declined segments of the conveyer. Unless countered, such forces may tend to cause these segments to run out of control. Horizontal segments may also coast to a degree that is not desired. Accordingly, belt conveyers are usually equipped with suitable brakes to retard acceleration, as well as to regulate stopping time and distance.

Electric drive motors have often been operated in a regenerative mode to provide braking of a belt conveyer. While these motors generally provide effective braking, they often add unnecessary cost to the overall conveyer system. This may be particularly true in a declined segment, where several such motors may be utilized only for purposes of braking.

To reduce overall expenditures, mechanical friction brakes may be utilized in lieu of regenerative motors where appropriate. Such friction brakes may be spring set so that braking torque will be applied in the absence of brake actuation. In this case, electric or hydraulic actuation will cause the braking torque to be selectively lessened.

By their design, friction brakes of this type function to bring a conveyer to a stop in the occurrence of a power failure, as desired. This configuration, however, will generally also cause an interruption in brake cooling after a power failure. In the case of a liquid-cooled brake, for example, such power failure will generally cause the coolant pump to shut down. As a result, a short period of time may transpire in which coolant fluid is not being fed into the brake. During this period, the brake linings may be damaged by the generated heat.

It is also often difficult with mechanical friction brakes to readily ascertain when the brake linings have worn beyond a predetermined threshold.

SUMMARY OF THE INVENTION

The present invention recognizes and addressees the foregoing disadvantages, and others of prior art constructions and methods. Accordingly, it is an object of the present invention to provide an improved brake system for use with a rotatable mechanical load, such as a conveyer pulley.

It is another object of the present invention to provide an improved brake system in which flow of coolant fluid will continue for a predetermined period of time after a power failure.

It is another object of the present invention to provide an improved brake system which automatically applies maximum braking torque when brake wear has exceeded a preselected threshold.

It is also an object of the present invention to provide an improved coolant circulation apparatus for use with a mechanical device.

Some of these objects are achieved by a brake system for use with a rotatable mechanical load. The brake system includes a brake unit having a rotatable shaft operatively coupled to the mechanical load. A braking mechanism within the brake unit selectively applies a braking torque to the rotatable shaft for regulating the rotational speed of the mechanical load. Preferably, the braking mechanism is biased to normally apply a predetermined braking torque to the rotatable shaft. Such a braking mechanism may be controllably released to vary the braking torque applied to the rotatable shaft as desired.

In presently preferred embodiments, generated heat is removed from the braking mechanism by a coolant fluid. The coolant fluid may be supplied by a pump in fluid coupling with the brake unit. The pump itself may be driven by operative rotation of a pump drive shaft via appropriate driving means, such as an electric motor.

In presently preferred embodiments, a flywheel is coupled between the driving means and the pump drive shaft to be rotatable therewith. This flywheel is configured to continue rotation of the pump drive shaft for a preselected period of time should the electric motor or other driving means cease to operate. As a result, coolant fluid may continue to be supplied to the braking mechanism until the mechanical load comes to a stop. In an exemplary construction, the flywheel is configured to continue operative rotation of the pump drive shaft for at least twenty (20) additional seconds after interruption of the driving means.

The pump and operative components thereof are preferably incorporated within an improved lubricant circulation apparatus of the present invention. The lubricant circulation apparatus includes fluid inflow means for providing fluid coupling between the pump and the brake unit or other mechanical device. Such fluid inflow means permit inflow of the coolant fluid into the pump. Similarly, fluid outflow means provide a fluid flow path between the pump and the brake unit to permit return flow of the coolant fluid. A heat exchanger may be operatively connected in the fluid flow path between the pump and the brake unit to dissipate heat in the coolant fluid prior to flow thereof back into the brake unit.

Other objects are achieved by a brake apparatus constructed in accordance with the present invention. Such a brake apparatus includes a longitudinal shaft having a first end portion and a second end portion. The longitudinal shaft is rotatably supported by a stationary housing such that the first end portion extends for coupling to the rotatable mechanical load. The brake apparatus includes a braking assembly comprising at least one first frictional member fixedly connected to the longitudinal shaft and at least one second frictional member fixedly connected to the stationary housing. The braking assembly is engagable to apply a braking torque to the longitudinal shaft.

Preferably, a biasing mechanism is provided to cause frictional engagement of the braking assembly, thus applying a predetermined braking torque to the longitudinal shaft. An engaging mechanism, responsive to introduction of actuation fluid into a fluid chamber, is also provided for selectively releasing the braking assembly. As a result, the braking torque applied to the longitudinal shaft is lessened. The actuation fluid is preferably introduced into the fluid chamber through a fluid inlet located such that the engaging mechanism will be urged by the biasing mechanism when wear of the braking assembly has exceeded a preselected threshold to a position so as to prevent the actuation fluid from being introduced into the fluid chamber.

In presently preferred embodiments, the at least one first frictional member comprises a first plurality of annular brake plates maintained by a rotating plate carrier secured to the second end portion of the longitudinal shaft. Similarly, the at least one second frictional member preferably comprises a plurality of annular brake plates maintained by a stationary plate carrier integral with the stationary housing. Respective of the first plurality of annular brake plates and second plurality of annular brake plates are interleaved in axial displacement along the longitudinal shaft to form the braking assembly.

The engaging mechanism preferably comprises an annular piston juxtaposed to the braking assembly. Such an annular piston will generally be axially movable in a direction away from the braking assembly in response to introduction of the actuation fluid into the fluid chamber. The biasing mechanism preferably comprises a plurality of removable spring assemblies radially displaced about the longitudinal shaft and located to urge the annular piston toward the braking assembly. Each of the plurality of removable spring assemblies may be maintained by respective spring holding bolts threaded into complementary bores in the stationary housing.

In one exemplary construction, each of the removable spring assemblies includes at least one helical spring having a longitudinal guide rod coaxially mounted therein. In this case, first and second cup members may be disposed over opposite axial ends of such helical spring. One of these cup members may define a hole in an end thereof to permit passage of the guide rod therethrough as the helical spring is compressed.

In another exemplary construction, each of the plurality of removable spring assemblies includes a longitudinal guide rod having a first concentric flange and a second concentric flange at respective ends thereof. An end washer may be mounted on the guide rod proximate to said first concentric flange to be freely slidable thereon. A plurality of bellville washers are mounted on the guide rod between the end washer and the second concentric flange to form a spring. A cup member is preferably disposed over the spring such that a closed end thereof engages the annular piston.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying figures, in which:

FIG. 2 is an enlarged elevation of a flywheel utilized in the brake system of FIG. 1 to continue operative rotation of the pump drive shaft in accordance with the present invention;

FIG. 3 is a view of a brake apparatus constructed in accordance with the present invention as taken along lines 3—3 of FIG. 1;

Figure 1:
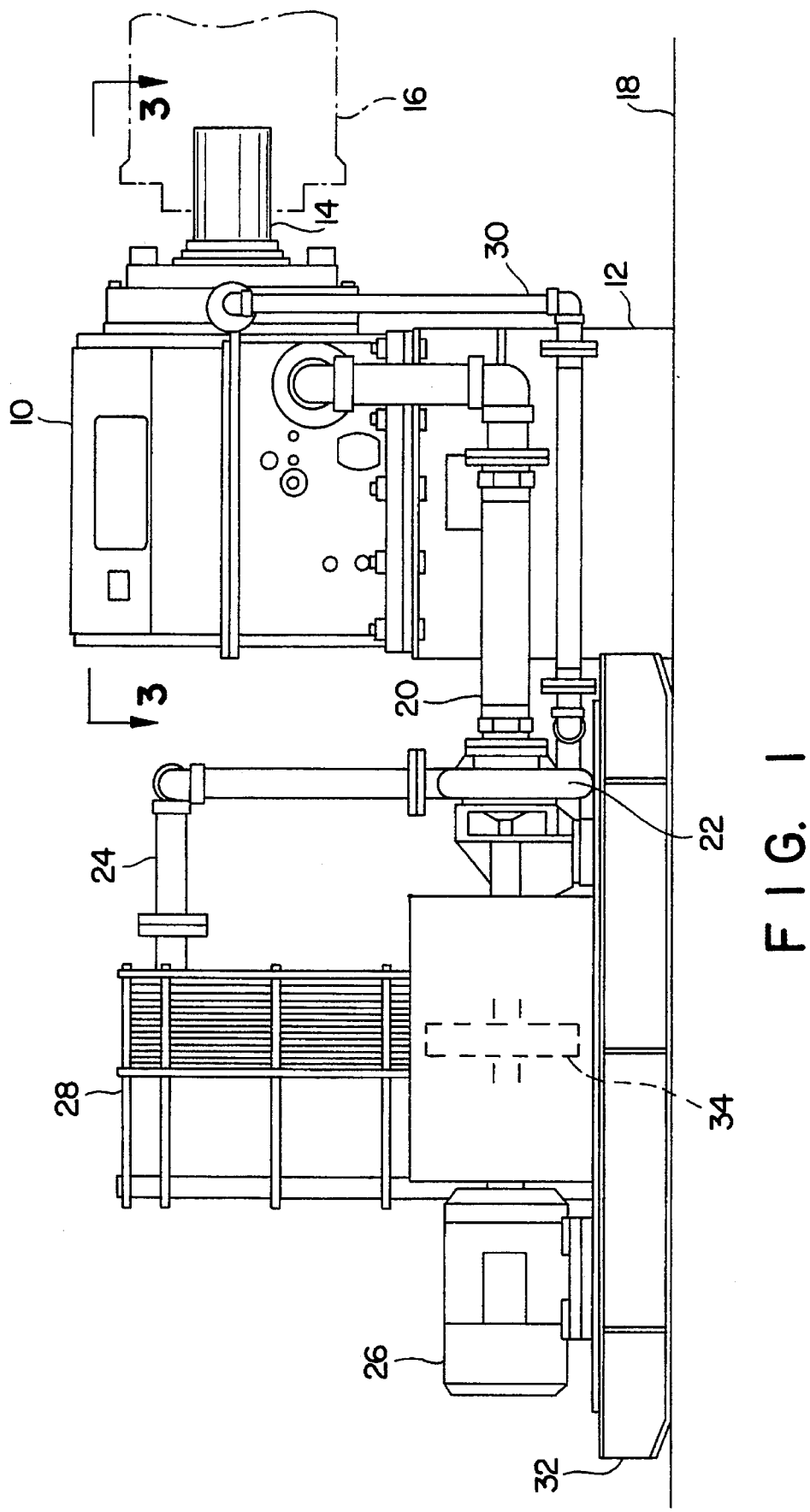
FIG. 1 is a side elevation of a brake system constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

FIG. 1 illustrates a presently preferred embodiment of a brake system constructed in accordance with the invention. The brake system includes a brake unit 10 mounted on a suitable base 12. A rotatable shaft 14 of brake unit 10 is operatively coupled to a rotatable mechanical load via an appropriate coupling schematically indicated at 16. Brake unit 10 is elevated to the level of coupling 16 as shown. Base 12 rests upon the ground, which is indicated at 18.

As discussed above, it is contemplated that one significant application which a brake system of the present invention may be utilized is that of a belt conveyer for transporting bulk materials. In this case, the load may be a conveyer pulley or the like. It should be appreciated, however, that many aspects of the present invention have utility in other environments. As such, the load may often be another type of rotatable mechanical load.

Brake unit 10 includes therein a braking mechanism for selectively applying a braking torque to shaft 14. The frictional action of such braking may generate a substantial amount of heat. In presently preferred embodiments, heat removal may be accomplished by passing a coolant fluid through brake unit 10. Heat in the coolant fluid is then dissipated utilizing coolant circulation apparatus such as that shown in FIG. 1.

The lubricant circulation apparatus includes a fluid inflow pipe 20 providing fluid coupling between brake unit 10 and a pump 22. Pump 22 may be a gear pump, screw pump, centrifugal pump, or other appropriate circulating pump. Pump 22 functions to draw the hot coolant fluid from brake unit 10 and passes it to first outflow pipe 24. Pump 22 is driven, in this case, by an electric motor 26, although it should be understood that other suitable means of driving pump 22 may also be provided.

The coolant fluid is then passed through a heat exchanger 28, where much of the generated heat is dissipated. Heat exchanger 28 may be a fluid-air or a fluid-water heat exchanger or other suitable heat exchanger structure. After passing through heat exchanger 28, the coolant fluid returns to brake unit 10 via second outflow pipe 30. Pump 22, motor 26, and heat exchanger 28, along with associated components thereof, are carried by a skid 32 resting on the ground 18.

The braking mechanism within brake unit 10 is preferably biased to normally apply maximum braking torque to rotatable shaft 14. In this case, actuation of the braking mechanism functions to selectively lessen the braking torque applied to shaft 14. As a result, full braking will generally be applied to the load in the event of a power failure or other undesired exigency which interferes with the controlled actuation of the braking mechanism.

As discussed above, a power failure will also generally cause an interruption in the operation of motor 26. Due to the design of brake unit 10, this will cause pump stoppage at the same time in which full braking torque is applied to shaft 14. Unless means are provided to continue operation of pump 22, flow of coolant fluid through the braking mechanism will, therefore, be discontinued during the period before the load is brought to a stop. Because the braking torque during this period is maximum and sustained, a concurrent interruption in the flow of coolant fluid can be especially problematic.

To continue flow of coolant fluid during the period after a power failure in which the load is brought to a stop, the present invention provides a flywheel 34 coupled between an output shaft 36 of motor 26 and a pump drive shaft 38 of pump 22. As can be most easily seen in FIG. 2, flywheel 34 is coupled in this case to shafts 36, 38 at respective coupling assemblies 40, 42. Bearings within respective pillow blocks 44, 46 further facilitate smooth rotation of flywheel 34. While certain preferred means of operatively connecting flywheel 34 have been shown, it should appreciated that any appropriate means may be utilized for this purpose within the scope of the present invention.

Flywheel 34 is configured to provide sufficient flow of coolant fluid during a period subsequent to a power failure or the like in order to prevent damage to the braking mechanism. For example, consider a situation in which brake unit 10 is expected to bring a loaded conveyer to a stop in approximately 10 to 15 seconds. Theoretically, sufficient coolant fluid may be provided to brake unit 10 if it is supplied at a rate which linearly decreases from a predetermined maximum at the instant of the power failure to a rate of zero at the expiration of this period of time. This "ideal" flow characteristic may then serve as a benchmark which may be used for purposes of determining the size of flywheel 34. It should be noted, however, that the flow characteristic provided by a particular flywheel will not decrease linearly, but will resemble the form of a decaying exponential. As such, flywheel 34 is preferably chosen such that its characteristic curve does not dip significantly below the linearly decreasing "ideal" curve during the period in which the load is coming to a stop.

Figure 4:
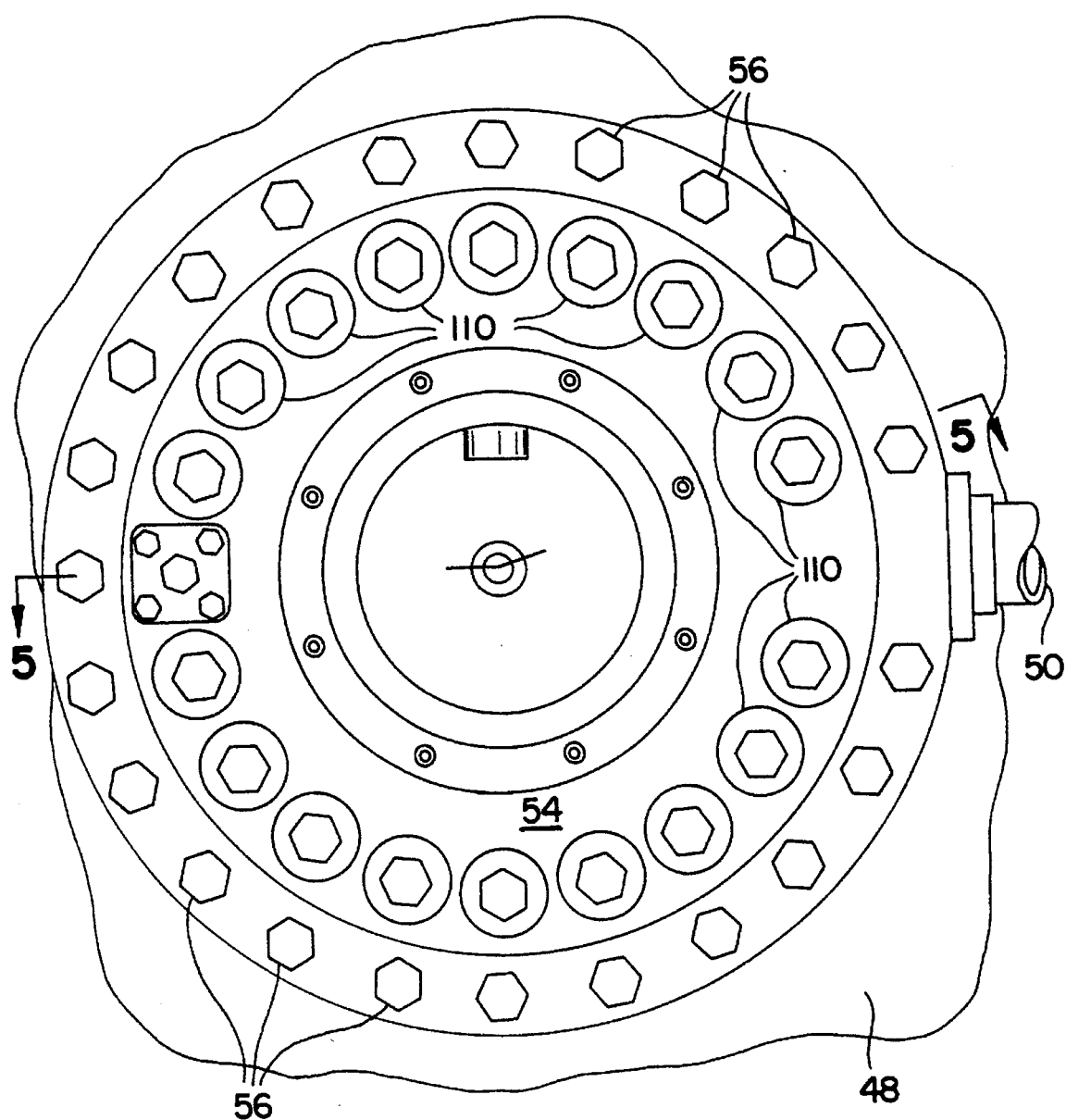
FIG. 4 is an enlarged end view as taken along lines 4—4 of FIG. 3.

Referring to FIGS. 3 and 4, brake unit 10 includes a stationary housing 48 in which shaft 14 is rotatably supported. Cooling fluid enters brake unit 10 through a fluid inlet 50 and then passes through the braking mechanism generally indicated at 52. After flowing through braking mechanism 52, the coolant fluid falls into the bottom portion of housing 48, which serves as a sump. As described above with respect to FIG. 1, the hot coolant fluid is then drawn from the sump through inflow pipe 20 by pump 22. It should appreciated that, in addition to providing cooling of components within brake mechanism 52, the coolant fluid also serves as a lubricant.

Figure 5:
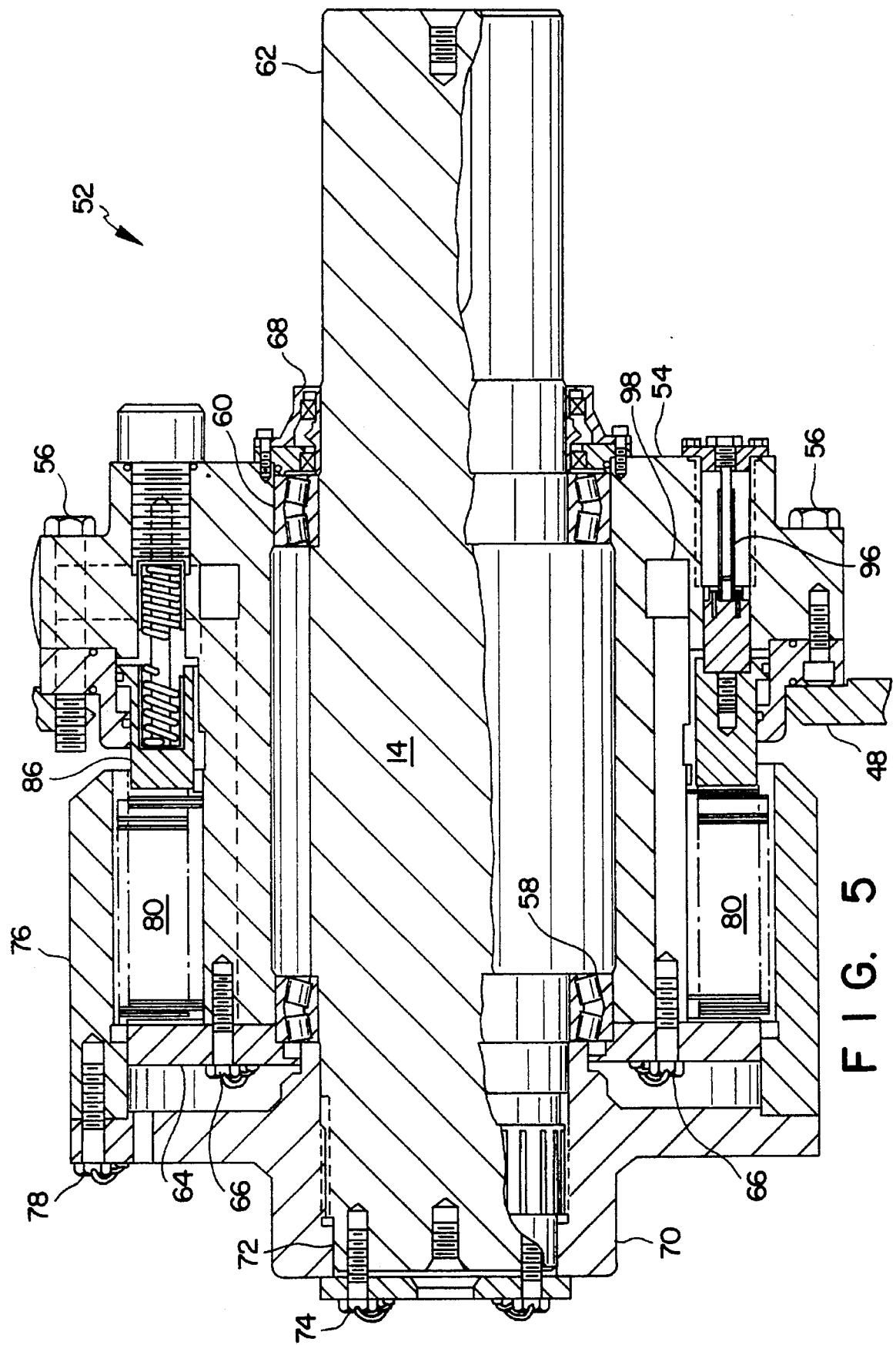
FIG. 5 is a partial cross sectional view as taken along lines 5—5 of FIG. 4.

The internal construction of a presently preferred embodiment of brake mechanism 52 can be most easily understood with reference to FIG. 5. As shown, shaft 14 is supported in this case by a stationary shaft carrier 54 which is fixedly attached to housing 48 by a plurality of bolts 56 or the like. Carrier 54 includes a pair of bearing assemblies 58, 60 to facilitate rotation of shaft 14. A first end portion 62 of shaft 14 extends to permit coupling to the load.

Carrier 54 further includes an annular back plate 64 which is attached utilizing a plurality of bolts 66 or the like. Back plate 64 is removable to facilitate assembly of the braking mechanism as will be explained more fully below. As shown, the boltheads of bolts 66 are wired together to reduce the loosening effects of vibration. Carrier 54 also includes appropriate seals indicated generally at 68 to maintain a substantially fluid-tight seal about shaft 14.

A rotating plate carrier 70 is fixedly secured to a second end portion 72 of shaft 14. As shown, end portion 72 preferably includes a plurality of circumferential splines which are complementary to splines on an interior surface of plate carrier 70. Plate carrier 70 is secured to end portion 72 in this case by a plurality of bolts 74, which have their respective boltheads wired together as shown. To facilitate assembly, plate carrier 70 includes separable cylindrical portion 76 which is attached by a plurality of bolts, such as bolts 78. Bolts 78 may also have their respective boltheads wired together.

Figure 6:
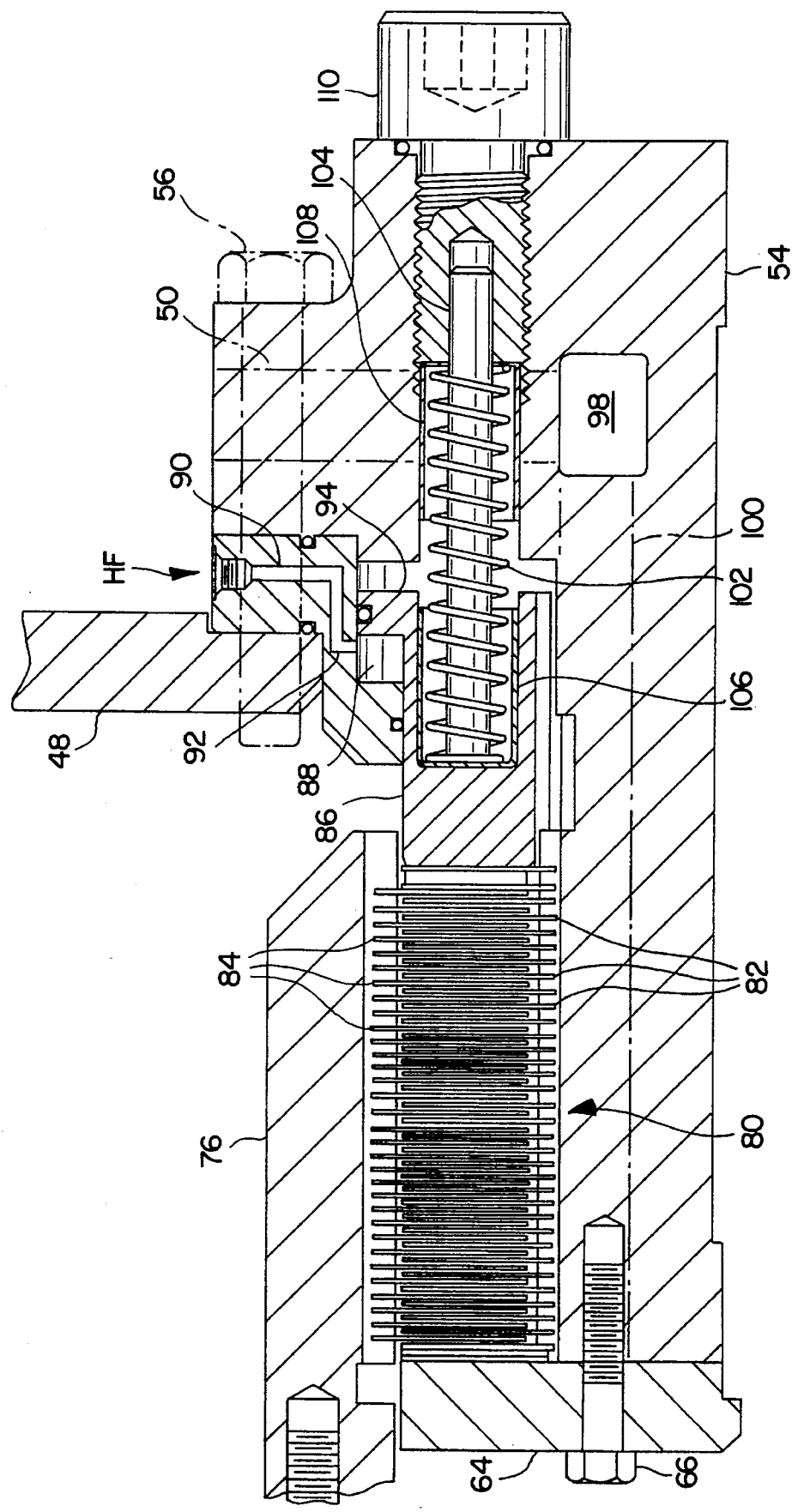
FIG. 6 is an enlarged cross sectional view illustrating a preferred braking assembly and actuation mechanism constructed in accordance with the present invention.

As can be most clearly seen in FIG. 6, braking is effected in presently preferred embodiments by a plurality of annular brake plates which collectively form a braking assembly, which will be referred to herein as brake plate assembly 80. Specifically, brake plate assembly 80 includes a plurality of first brake plates 82 maintained by stationary carrier 54. Similarly, a plurality of second brake plates 84 are maintained by cylindrical portion 76 of plate carrier 70.

Plates 82, 84 are interleaved as shown about an axial portion of shaft 14. As a result, frictional engagement of plates 82, 84 will apply a braking torque to plate carrier 70, and thus to shaft 14. For this purpose, plates 84 preferably include suitable lining material on their front and back engaging surfaces. Plates 82, which may be referred to as opposing plates, may be constructed without such lining material. As a result, much of the wear will be absorbed by plates 84.

An annular piston 86 is axially juxtaposed to brake plate assembly 80 as shown. Axial movement of annular piston 86 to the left (in the frame of reference of FIG. 6) causes an increase in the frictional engagement of plates 82, 84. Likewise, axial movement of annular piston 86 to the right causes a lessening of the frictional engagement of plates 82, 84. In this manner, the braking torque applied to shaft 14 may be varied as desired.

As described above, means are preferably provided to normally bias braking plate assembly 80 to apply maximum braking torque to shaft 14. Such biasing means may comprise a plurality of spring assemblies which are radially displaced about shaft 14 in position to urge annular piston 86 toward brake plate assembly 80.

Annular piston 86 is moved away from brake plate assembly 80 by the introduction of hydraulic fluid into an annular fluid chamber 88. This hydraulic fluid is introduced into fluid chamber 88 through a fluid inlet 90 (as indicated by arrow HF) by a suitable hydraulic control system. Operative details of a hydraulic control system which may be utilized for this purpose would be readily apparent to one of ordinary skill in the art and are therefore not discussed in detail herein.

Over time, the brake linings on plates 84 will experience wear. As this happens, biasing of annular piston 86 will tend to move plates 82, 84 closer together. At some point, however, these brake linings will wear to a degree that maintenance of brake plate assembly 80 will be required.

In order to alert service personnel that such maintenance is required, a terminal portion 92 of fluid inlet 90 is positioned such that maximum braking torque will be automatically applied when wear has exceeded a predetermined threshold. Specifically, a seal carried by flange portion 94 of annular piston 86 will be past terminal portion 92 when wear has exceeded the predetermined threshold level. Thus, further hydraulic fluid introduced into fluid inlet 90 will not enter fluid chamber 88, but will simply fall behind flange portion 94. As a result, the maximum braking torque cannot be released until brake plate assembly 80 has been properly serviced.

Referring again to FIG. 5, presently preferred embodiments further include a linear position transducer, generally referenced as 96, to provide electronic indication of the degree of wear of brake plate assembly 80. In this case, transducer 96 includes an outer sleeve affixed to annular piston 86. A rod portion, which is fixedly secured to carrier 54, is slidably inserted into the outer sleeve for relative movement with respect thereto. As the biasing of annular piston 86 compensates for increasing wear of brake plate assembly 80, the degree to which the rod portion extends into the sleeve portion will decrease. This is reflected by an electronic signal, which is indicative of such wear. A suitable transducer for this purpose is the model HS-2000 "hydraulic fast linear position transducer" manufactured by a company named Data Instruments of Acton, Mass. 01720.

As stated above, the cooling fluid is introduced into brake mechanism 52 through fluid inlet 50. The coolant fluid then enters an annular passage 98 defined by carrier 54. As shown, annular passage 98 encircles shaft 14 and distributes the coolant fluid to a plurality of radially spaced passages 100. Passages 100, in turn, extend axially back to brake plate assembly 80. The coolant fluid then passes between respective of plates 82, 84, and subsequently flows into the sump defined by housing 48.

One presently preferred embodiment of a spring assembly utilized to bias annular piston 86 is illustrated in FIG. 6. In this case, a helical spring 102 is coaxially mounted about a longitudinal guide rod 104. Guide rod 104 functions to ensure that helical spring 102 compresses and expands smoothly without buckling. Preferably, cups 106, 108 are also disposed over each end of spring 102 so that the overall assembly will form an easily manipulated unit. Cups 106, 108 are preferably hardened, such as being carburized.

Cup 108 defines a hole in an end thereof to allow passage of guide rod 104 therethrough. Spring holding bolt 110, which is threaded into a complementary bore in stationary carrier 54, preloads spring 102 when installed for use. Toward this end, the threaded shaft of bolt 110 defines a bore for receiving therein a portion of guide rod 104. In this case, the bolthead of spring holding bolt 110 defines an allen socket so that it may be easily threaded into or out of position when rotated with an appropriate tool.

Figure 7:
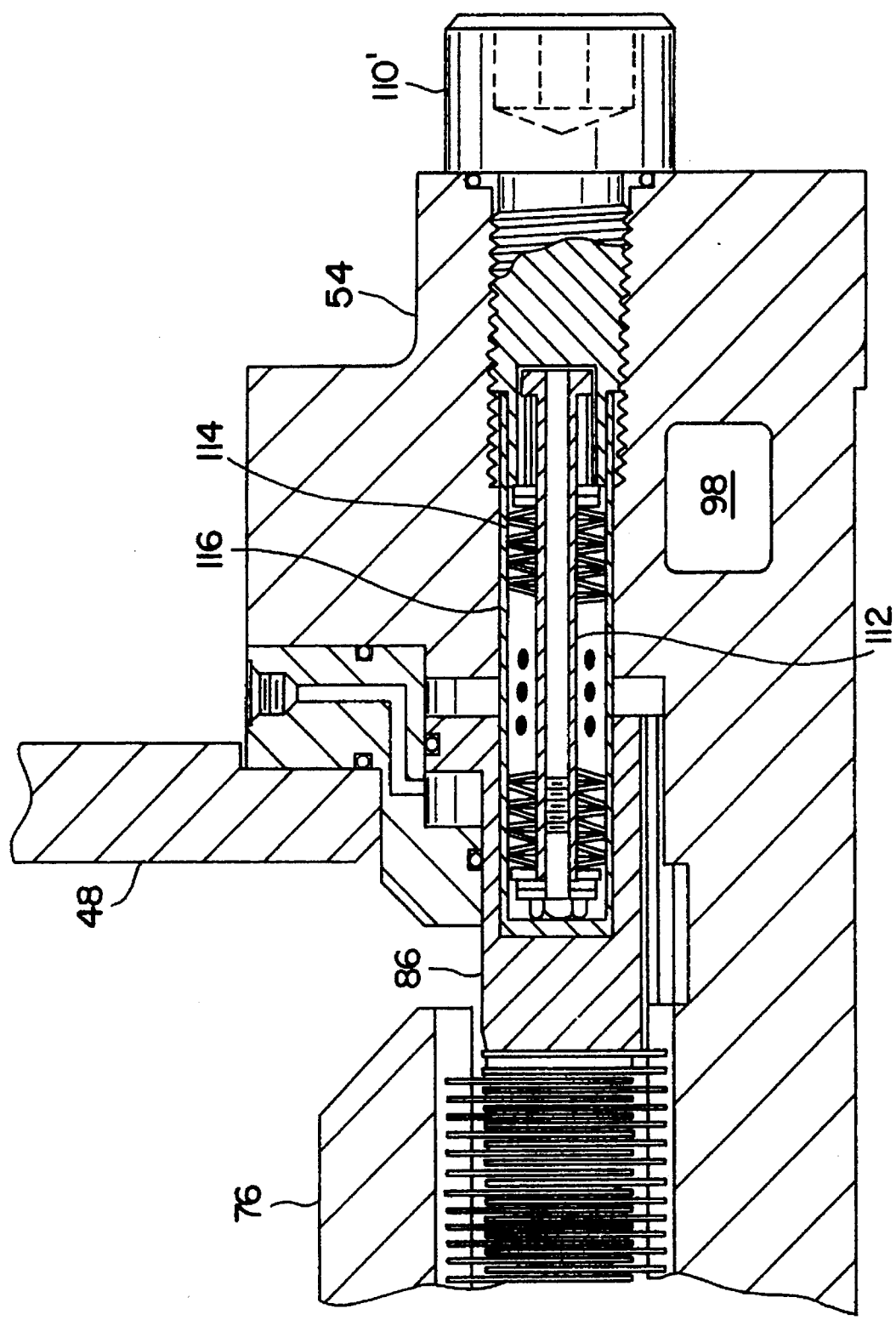
FIG. 7 is a view similar to FIG. 6 illustrating an alternative exemplary construction of a removable spring assembly constructed in accordance with the present invention.

FIG. 7 illustrates an alternative embodiment of a spring assembly constructed in accordance with the present invention. In this case, a longitudinal guide rod 112 is provided having a flange at each axial end thereof. As shown, the first such flange is stationary with respect to guide rod 112. The second such flange, on the other hand, is produced by securing washers to the opposite end of guide rod 112. These washers are secured utilizing a bolt threaded into the interior of guide rod 112 as shown. Flat washers are also carried adjacent the stationary flange to be freely slidable with respect to guide rod 112.

A spring may be formed in this embodiment by stacking a plurality of bellville washers 114 between the second flange and the slidable flat washers. Although only a few such bellville washers 114 are actually shown, it should be understood that such washers should be continuously stacked between the stationary flange and the slidable flat washers. A hardened cup 116 is then disposed over the resultant spring, with its open end directed away from annular piston 86. The shaft of spring holding bolt 110' is configured such that a portion thereof will fit into cup 116 for pushing against the slidable flat washers to preload the spring.

A spring formed of bellville washers in this manner is known to produce a characteristic load versus deflection curve having a "flat" region in which relatively large variations in spring deflection will result in relatively small changes in applied force. This is useful in the present invention due to the fact that wear of brake plate assembly 80 will generally cause expansion of the spring. With proper design, the effects of such wear on the applied spring force can be minimized by choosing the number and configuration of each bellville washer 114 to operate in this "flat" region.

The radial displacement of the respective spring assemblies can be best understood with reference to FIG. 4. There, the plurality of spring holding bolts 110 is illustrated, each of which may be loaded with a spring assembly. The number of such spring assemblies, as well as the spring constant of each, will depend upon the exigencies of a particular application. Specifically, the dynamics of a particularly conveyor may be such that it is desirable to have lesser or greater biasing force. In this regard, if lesser biasing force is desired, fewer springs, or springs of lower spring constant, may be utilized. Similarly, if greater biasing force is desired, more springs, or spring of greater spring constant, may be utilized. It may also be desirable in some applications to utilize concentric helical springs, with or without a guide rod, to give enhanced spring force. Stopping time in the event of a power failure may also be controlled to some degree in this manner.

Figure 8:
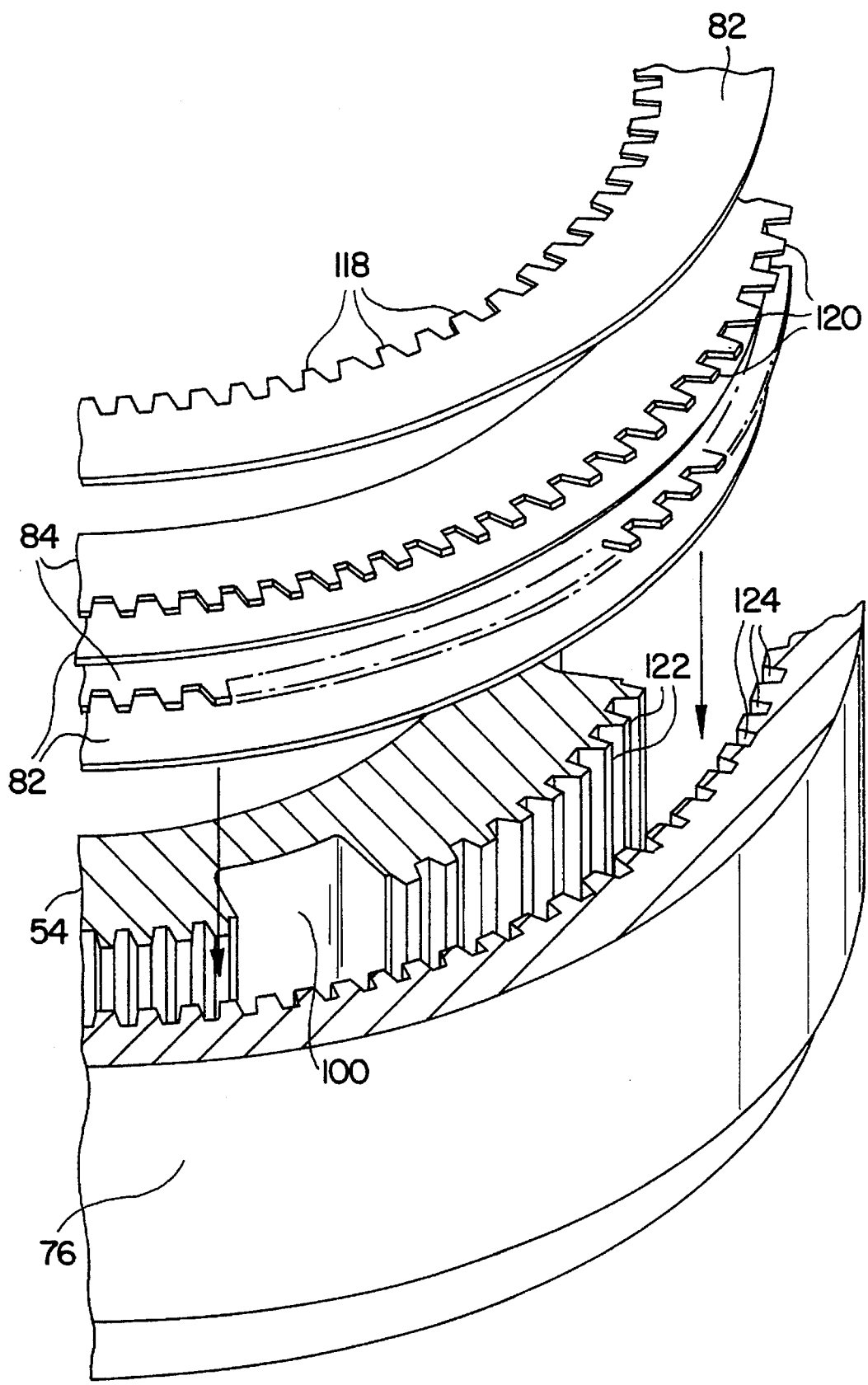
FIG. 8 is an assembly view illustrating the manner in which respective annular brake plates are preferably installed in a brake apparatus constructed in accordance with the present invention.

The installation of brake plates 82, 84 may be most readily understood with reference to FIG. 8. As can be seen, brake plates 82 define a plurality of tooth members 118 about their inner circumference. Tooth members 118 slide into complementary longitudinal grooves 122 defined in an outer circumferential surface of stationary carrier 54. Similarly, brake plates 84 define a plurality of tooth members 120 which slide into longitudinal grooves 124 in an inner circumferential surface of cylindrical portion 76 of brake plate carrier 70. In this manner, respective of brake plates 82, 84 may be alternately stacked to form brake plate assembly 80. After all of plates 82, 84 are in position, annular back plate 64 may then be attached to maintain brake plate assembly 80.

While certain preferred embodiments of the invention have been shown and described, it is to be understood that modifications and variations may be made thereto without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A brake apparatus for use with a rotatable mechanical load, said brake apparatus comprising:

a longitudinal shaft having a first end portion and a second end portion;

a stationary housing rotatably supporting said longitudinal shaft such that said first end portion extends for coupling to said mechanical load;

a braking assembly having at least one first frictional member fixedly connected to said longitudinal shaft and at least one second frictional member fixedly connected to said stationary housing, said first frictional member and said second frictional member engagable to apply a braking torque to said longitudinal shaft;

an engaging mechanism responsive to introduction of actuation fluid into a fluid chamber for selectively releasing the braking assembly and thereby lessening the braking torque applied to said longitudinal shaft;

a biasing mechanism for causing frictional engagement of said first frictional member and said second frictional member in the absence of actuation of said engaging mechanism to apply a predetermined braking torque to said longitudinal shaft; and wherein the actuation fluid is introduced into said fluid chamber through a fluid inlet located such that said engaging mechanism will be urged by said biasing mechanism when wear of said braking assembly has exceeded a preselected threshold to a position wherein said actuation fluid cannot be introduced into said fluid chamber.

2. A brake apparatus as in claim 1, wherein said at least one first frictional member comprises a first plurality of annular brake plates and said second frictional member comprises a second plurality of annular brake plates, respective of said first and second plurality of annular brake plates interleaved in axial displacement along said longitudinal shaft to form said braking assembly.

3. A brake apparatus as in claim 2, wherein said engaging mechanism comprises an annular piston juxtaposed to said braking assembly and being axially movable in a direction away from said braking assembly by introduction of actuation fluid into the fluid chamber.

4. A brake apparatus as in claim 3, wherein said biasing mechanism comprises a plurality of removable spring assemblies radially displaced about said longitudinal shaft and located to urge said annular piston toward said braking assembly.

5. A brake apparatus as in claim 3, further comprising an electrical sensor operative to produce an electrical signal indicative of a relative position of said annular piston.

6. A brake apparatus for use with a rotatable mechanical load, said brake apparatus comprising:

a longitudinal shaft;

a stationary housing rotatably supporting said longitudinal shaft such that a first end portion extends for coupling to said mechanical load;

a rotating plate carrier fixedly secured to said longitudinal shaft, said rotating plate carrier having a cylindrical portion concentric with said longitudinal shaft maintaining a first plurality of annular brake plates in axial displacement along said longitudinal shaft;

a stationary plate carrier integral with said stationary housing and having said longitudinal shaft extending completely therethrough, said stationary plate carrier being positioned radially between said longitudinal shaft and said cylindrical portion of said rotating plate carrier, said stationary plate carrier maintaining a second plurality of annular brake plates in axial displacement along said longitudinal shaft, said first plurality of annular brake plates and said second plurality of annular brake plates being interleaved to form a braking assembly;

an actuating mechanism for selectively varying frictional engagement of said first plurality of annular brake plates and said second plurality of annular brake plates to control a braking torque applied to said longitudinal shaft, wherein said actuating mechanism includes:

an annular piston juxtaposed to said braking assembly and being axially moveable in a direction away from said braking assembly by introduction of actuation fluid into a fluid chamber adjacent said annular piston, said annular piston thereby selectively lessening the braking torque applied to said longitudinal shaft; and a biasing mechanism for causing frictional engagement of said first plurality of annular brake plates and said second plurality of annular brake plates in the absence of actuation of said annular piston to apply a predetermined braking torque to said longitudinal shaft, wherein the actuation fluid is introduced into said fluid chamber through a fluid inlet located such that said annular piston will be urged by said biasing mechanism when wear of said braking assembly has exceeded a preselected threshold to an axial position wherein said actuation fluid cannot be introduced into said fluid chamber; and at least one coolant passage defined by said stationary plate carrier in communication with said first and said second plurality of annular brake plates such that coolant fluid may flow into said passage and then pass between respective of said annular brakes plates for cooling same.

7. A brake apparatus as in claim 6, further comprising cooling means including:

a pump in fluid coupling with said at least one coolant passage to supply said coolant fluid thereto, said pump being driven by operative rotation of a pump drive shaft; and driving means connected to said pump drive shaft for operatively driving said pump.

8. A brake apparatus as in claim 7, wherein said cooling means further comprises a flywheel coupled between said driving means and said pump drive shaft and rotatable therewith, said flywheel configured to continue rotation of said pump drive shaft for a preselected period of time upon cessation of operation of said driving means.

9. A brake apparatus as in claim 7, further comprising a heat exchanger operatively connected to said cooling means such that said coolant fluid will flow through said braking assembly and then into said heat exchanger to dissipate heat in said coolant fluid, said heat exchanger then directing said coolant fluid back to said cooling means for recirculation of same.

10. A brake apparatus as in claim 6, further comprising at least one bearing assembly positioned between said stationary plate carrier and said longitudinal shaft for supporting said shaft and facilitating rotation thereof.

11. A brake apparatus as in claim 6, further comprising at least one fluid-tight seal positioned between said stationary plate carrier and said longitudinal shaft.

12. A brake system for use with a rotatable mechanical load, said brake system comprising:

a brake unit having a rotatable shaft operatively coupled to said mechanical load, said brake unit having a braking mechanism biased to normally apply a predetermined braking torque to said rotatable shaft and being controllably releasable to vary the braking torque applied to said shaft;

said braking mechanism including a brake plate assembly having a first plurality of brake plates rotatable with said rotatable shaft and a second plurality of non-rotatable brake plates, said first plurality of brake plates and said second plurality of brake plates being interleaved;

said braking mechanism further including an annular piston defining a fluid chamber adjacent thereto, and a biasing mechanism for biasing said piston against said brake plate assembly causing said predetermined braking torque to normally be applied to said rotatable shaft, said piston being moveable in a direction away from said brake plate assembly by introduction of an actuation fluid into said fluid chamber for selectively lessening the braking torque applied to said shaft;

wherein the actuation fluid is introduced into said fluid chamber through a fluid inlet located such that, when wear of said brake plate assembly has exceeded a preselected threshold, said piston will be urged by said biasing mechanism to a position that substantially prevents said fluid chamber from receiving said actuation fluid thereby maintaining said piston against said brake plate assembly.

13. A brake system as in claim 12, wherein said braking mechanism further comprises:

an outer rotating plate carrier fixedly secured to said rotatable shaft, said rotating plate carrier maintaining said first plurality of annular brake plates in axial displacement along said rotatable shaft; and an inner stationary plate carrier affixed to a housing of said brake unit and positioned radially between said shaft and said outer rotating plate carrier, said stationary plate carrier maintaining said second plurality of annular brake plates in axial displacement along said rotatable shaft.

14. A brake system as set forth in claim 12, wherein the actuation fluid is introduced into said fluid chamber through said fluid inlet located such that a flange portion of said piston will be urged by said biasing mechanism when wear of said braking assembly has exceeded said preselected threshold to an axial position wherein said actuation fluid cannot be substantially introduced into said fluid chamber.

15. A brake system as in claim 12 further including means for cooling said brake unit, said cooling means comprising:

a pump in fluid coupling with said brake unit to supply a coolant fluid thereto for cooling said braking mechanism, said pump being driven by operative rotation of a pump drive shaft; and driving means connected to said pump drive shaft for operatively driving said pump.

16. A brake system as in claim 15, wherein said cooling means further comprises a flywheel coupled between said driving means and said pump drive shaft and rotatable therewith, said flywheel configured to continue rotation of said pump drive shaft for a preselected period of time upon cessation of operation of said driving means.

17. A brake system as in claim 16, wherein said preselected period of time that said flywheel is configured to continue operative rotation of said pump drive shaft is at least twenty (20) seconds after cessation of operation of said driving means.

18. A brake system as in claim 17, wherein said driving means is an electric motor.

19. A brake system as set forth in claim 15, further comprising a heat exchanger operatively connected between said pump and said brake unit such that said coolant fluid will flow therethrough to dissipate heat in said coolant fluid prior to flow thereof into said brake unit.

20. A brake apparatus for use with a rotatable mechanical load, said brake apparatus comprising:

a longitudinal shaft;

a stationary housing rotatably supporting said longitudinal shaft such that one end of said shaft extends for coupling to said mechanical load;

a braking assembly having at least one first frictional member fixedly connected to said longitudinal shaft and at least one second frictional member fixedly connected to said stationary housing, said first frictional member and said second frictional member engageable to apply a braking torque to said longitudinal shaft;

an annular piston juxtaposed to said braking assembly and being axially moveable in a direction away from said braking assembly by introduction of actuation fluid into a fluid chamber adjacent said annular piston, said annular piston thereby selectively lessening the braking torque applied to said longitudinal shaft; and a biasing mechanism for causing frictional engagement of said first frictional member and said second frictional member in the absence of actuation of said annular piston to apply a predetermined braking torque to said longitudinal shaft, said biasing mechanism comprising a plurality of removable spring assemblies radially displaced about said longitudinal shaft and located to urge said annular piston toward said braking assembly, each of said removable spring assemblies including a longitudinal guide rod, at least one helical spring coaxially mounted about said guide rod, and first and second cup members disposed over opposite axial ends of said helical spring, one of said first and second cup members defining a hole in an end thereof to permit said guide rod to pass therethrough as said at least one helical spring is compressed.

21. A brake apparatus as in claim 20, wherein the actuation fluid is introduced into said fluid chamber through a fluid inlet located such that, when wear of said braking assembly has exceeded a preselected threshold, said annular piston will be urged by said biasing mechanism to a position that substantially prevents said fluid chamber from receiving said actuation fluid thereby maintaining said piston against said braking assembly.

22. A brake apparatus as in claim 20, further comprising:

an outer rotating plate carrier fixedly secured to said longitudinal shaft, said rotating plate carrier maintaining said at least one first frictional member at a predetermined axial location along said longitudinal shaft; and an inner stationary plate carrier affixed to said stationary housing and positioned radially between said longitudinal shaft and said outer rotating plate carrier, said stationary plate carrier maintaining said at least one second frictional member at a predetermined axial location along said longitudinal shaft, said stationary plate carrier defining at least one coolant passage, said coolant passage being in communication with said at least one first frictional member and said at least one second frictional member such that coolant fluid may flow into said passage and then pass between said frictional members for cooling same.

23. A brake apparatus as in claim 22, further comprising means for cooling said braking assembly, said cooling means including:

a pump in fluid coupling with said at least one coolant passage, said pump being driven by operative rotation of a pump drive shaft; and driving means connected to said pump drive shaft for operatively driving said pump.

24. A brake apparatus as in claim 23, further comprising a flywheel coupled between said driving means and said pump drive shaft and rotatable therewith, said flywheel configured to continue rotation of said pump drive shaft for a preselected period of time upon cessation of operation of said driving means.

* * * * *